UNITED STATES PATENT OFFICE.

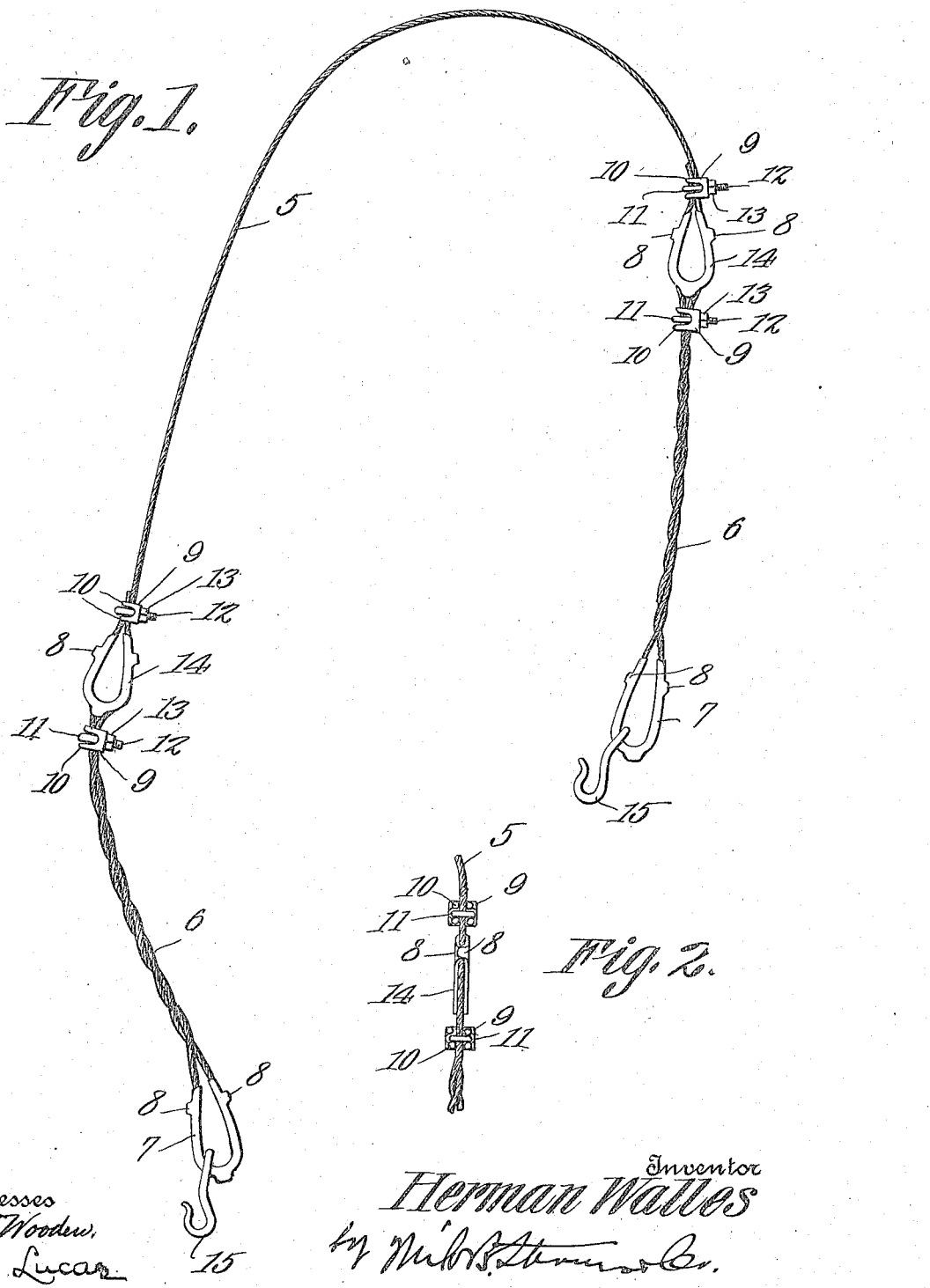

HERMAN WALLES, OF CHICAGO, ILLINOIS.

TOW-LINE.

1,145,722.

Specification of Letters Patent.

Patented July 6, 1915.

Application filed August 3, 1914. Serial No. 854,817.

*To all whom it may concern:*

Be it known that I, HERMAN WALLES, a citizen of the United States, residing at Chicago, in the county of Cook and State of Illinois, have invented certain new and useful Improvements in Tow-Lines, of which the following is a specification.

The tow line which is the subject matter of the present application for patent is designed more particularly for hauling stalled motor cars, the object of the invention being to provide a tow line which can be easily and quickly connected and made ready for use.

With the herein stated object in view, the invention consists in a novel combination and arrangement of parts to be hereinafter described and claimed, reference being had to the accompanying drawing, in which—

Figure 1 is a plan view of the line, and Fig. 2 is an elevation of a portion of the line showing certain clamping members.

Referring specifically to the drawing, 5 denotes the tow line, the same being made of twisted or braided steel wire or other suitable material. Each end of the line is doubled on itself and twisted, as indicated at 6, in such a manner as to leave an eye which is fitted with a thimble 7, the latter comprising a U-shaped member fitting in the loop and channeled in cross section to form a seat for the line. At the edges of the thimble are ears 8 which are bent over the line to hold the thimble in place thereon. Near the inner end of each doubled portion of the line are mounted two spaced clamping members, each comprising a clip plate 9 having corner lugs 10 between which the line passes. The other part of the clamping member is a staple 11 which is hooked across that portion of the line which seats between the lugs, and has a threaded stem 12 passing through the clip plate and secured to the latter by a nut 13 screwed on the end protruding from the back of the clip plate. The two clamping members are spaced from each other a sufficient distance to permit the application of a thimble 14 to that portion of the two parts of the line which is located between the clamping members, said parts being spread to form an eye. The thimble seats in this eye and it is similar to the thimble 7 hereinbefore described. The thimble 7 carries a hook 15.

Both ends of the line are provided with the thimble, clamps and hook hereinbefore described.

The line is applied by passing one end around the axle or other part of the stalled car and slipping the hook 15 into the thimble 14. The other end of the line is connected to the other car in a like manner, and thus a strong, and easily applied and detached connection is had.

I claim:

A tow-line having its ends doubled, clamps applied to the doubled ends of the line for holding the same together, thimbles mounted in the loop formed by the doubled ends of the line, thimbles around which that portion of the line which is between the clamps passes, and hooks carried by the first-mentioned thimbles.

In testimony whereof I affix my signature in presence of two witnesses.

HERMAN WALLES.

Witnesses:
S. J. LEHRER,
H. G. BATCHELO..